United States Patent Office 2,873,620
Patented Feb. 17, 1959

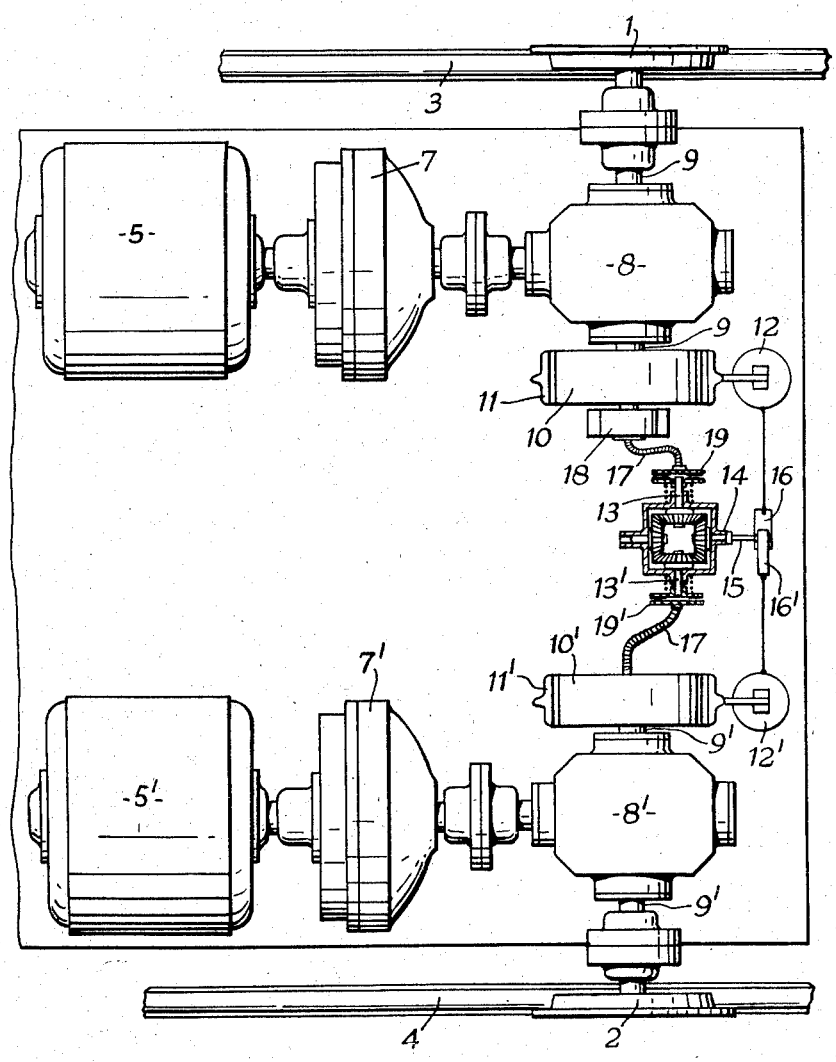
INVENTOR
Harold Sinclair
BY
Benjamin Sweedler
ATTORNEY

2,873,620

CONTROL MECHANISMS

Harold Sinclair, Windsor, England

Application February 10, 1954, Serial No. 409,419

Claims priority, application Great Britain
February 11, 1953

7 Claims. (Cl. 74—665)

This invention relates to control mechanisms, the object being to provide a control mechanism which serves to maintain two movable members, which are individually driven, moving at substantially equal mean speeds or speed ratios.

A requirement for a mechanism serving this purpose may arise for example in the case of a track vehicle, such as a gantry crane in which the wheels run on rails which are widely spaced, for example 30 or more feet apart. In such a case it may be difficult to couple the wheels on one rail to the wheels on the other rail, and it becomes necessary to employ individual driving means for each wheel. There is then no interconnection of the pairs of wheels such as to ensure that they will rotate at the same speed, and if, as may easily happen, resistance to motion is greater on one side of the crane than on the other, the crane will skew and jam on the rails.

The requirement also arises in the case of two or more assembly line conveyors which are required to move side by side at the same mean speed, so that components carried by the two or more conveyors to an assembly point maintain a desired spaced relationship longitudinally of the conveyors.

In control mechanism according to the invention each individual driving means is coupled to its associated member to be driven through the intermediary of a slippable coupling, and means are provided for varying the relative slip in the coupling automatically in accordance with changes in the relative speeds of said driven members, in such sense as to oppose said changes.

The slippable couplings may be hydraulic turbo couplings of the traction or constant filling type, in which case the slip in the couplings may be controlled by means of brakes adapted to be directly or indirectly applied intermittently to the runner shafts of the couplings. If preferred the slippable couplings may be electromagnetic couplings.

In order to control the relative slip in the couplings in response to the differential speed of the driven members, use may be made of a differential gear, the two input elements thereof being arranged to be driven at speeds related to the speeds of the respective driven members, the arrangement being such that so long as the two members have equal speeds the output element of the differential gear, which may be the cage member, is stationary, whereas a tendency for one member to gain on the other results in a rotation of the said output element in one direction or the other according to which of the members is moving faster. This movement of the output element or cage member may be employed to control the slip in the couplings through the intermediary of electrical switch and brake mechanism.

In suitable cases the driven members may be coupled mechanically to the input elements of the differential gear, for example by means of light shafts and flexible drives capable of transmitting rotary motion. Alternatively, a synchronous electric generator may be associated with each driven member and be arranged to be driven at a speed related to the speed of the driven member, each generator being electrically connected to one of a pair of synchronous electric motors associated one with each of the input elements of the differential gear.

The single figure of the accompanying drawing is a plan view showing the application of the invention to the drive of a gantry crane.

The figure shows one pair of the wheels of the crane at 1 and 2, these wheels running on rails 3 and 4, which are say 30 ft. apart. The crane gantry is supported also on two further wheels (not illustrated), one on each rail. The wheels 1 and 2, which constitute the above-mentioned two movable members the speeds of which are to be maintained equal or substantially equal, are provided with individual driving means, shown as electric motors 5 and 5' which may be squirrel cage A. C. induction motors.

The shaft of motor 5 is coupled to the input or impeller shaft of a hydraulic turbo coupling 7 of the traction or constant filling type, and the output or runner shaft of the turbo coupling 7 is coupled to the input shaft of a worm reduction gear 8. The output shaft 9 of the reduction gear 8 is coupled at one end to the shaft of wheel 1, and the other end carries a brake drum 10, with which is associated a brake band 11 operable by an electric thrustor 12.

The driving connection between the motor 5' and driven wheel 2 includes a traction or constant filling type hydraulic turbo coupling 7', and a worm reduction gear 8', the shaft 9' of which carries a brake drum 10' with which is associated a brake band 11' operable by a thrustor 12'.

The control mechanism includes a differential gear comprising input elements 13 and 13' and an output element or cage member 14. The output element or cage member 14 carries a contact arm 15 which is disposed between electrical contacts 16 and 16'. The shafts of the brake drum 10 and 10' are connected by flexible shaft driving means 17, 17' to the respective input elements of the differential gear, through slippable clutches 19, 19' which are provided to limit the load that might be imposed on either of the flexible shaft drives, e. g., in the event of one or other of the driving wheels 1 or 2 slipping on its rail. A reverse gear 18 is provided between the shaft 9 and the flexible shaft drive 17.

In operation, when the motors 5 and 5' are de-energised the thrustors are also de-energised and they apply the brake bands 11 and 11' to the brake drums 10 and 10' respectively. When the motors are energised the thrustors are normally energised so as to release the brake bands from the brake drums, and so long as the two driven wheels 2 and 2' are rotating at the same speed the input elements 13 and 13' of the differential gear will in opposite directions rotate at the same speed, so that the output element or cage 14 of the differential gear is stationary and has an angular position such that the contact arm 15 carried by it is disposed between and out of contact with the electrical contacts 16 and 16'. If for any reason, for example due to greater resistance being encountered by the wheels on one side of the crane, i. e., on one of the rails, these wheels tend to slow down, or in other words if the wheels on the other side tend to gain, the speeds of the input element of the differential gear become different and the output element or cage 14 moves angularly, the direction in which it moves being determined by which set of wheels tends to gain, until the contact arm 15 contacts one or other of the contacts 16, 16', the effect of which is to open the energising circuit of the associated thrustor and thereby de-energise the thrustor so that the brake band is applied to the brake drum of the faster running wheel.

This brake application therefore slows down the gaining wheel and the runner of the associated turbo-coupling, until the speed of said wheel is slightly below that of the driven wheel on the other side of the crane, whereupon the cage 14 of the differential gear turns in the direction to remove the arm 15 from the contact, whereby the de-energised thrustor is again energised and releases the associated brake.

The braking action exerted by the thrustor brakes is adjusted to be insufficient to stall the runners of the turbo couplings 7 and 7', it being merely required that the slip in the turbo coupling on one side or other of the crane should be slightly increased momentarily to enable the gaining wheels on that side to be brought into step with the other wheels. In this way the mean speeds of the driven wheels 1, 1' of the crane may be kept substantially the same without affecting the speeds of the driving motors 5 and 5', which may therefore run at constant speed.

If desired, slip-ring motors may be employed as the driving motors, instead of squirrel-cage motors as described.

Another application of the invention is to the problem of keeping in step two or more assembly conveyors which are required to move parallel to one another at equal mean speeds. Where two such conveyors are driven by independent driving motors, for example squirrel-cage motors, it is found that even when the motors have the same constant speed there is frequently a tendency, due inter alia to a change in distribution of load on the conveyor or in friction, for one conveyor to gain on the other continuously or for the two conveyors to gain alternately one on the other. In order to keep the conveyors substantially in step, in accordance with the invention, the respective driving axles of the conveyors are coupled to the motors through the intermediary of hydraulic turbo couplings of the constant filling type, and the axles may be mechanically or electrically coupled, as in the case of the crane above-described, to a differential gear and electrical control mechanism associated with brakes, each brake being adapted when applied to slow down the runner of the associated turbo coupling and increase the slip in this coupling.

I claim:

1. Control mechanism comprising, in combination, a first movable member, means individual to said first movable member operable at a substantially constant speed for driving said first movable member, a slippable coupling in the driving connection between said driving means and said first movable member, a second movable member, means individual to said second movable member operable at a substantially constant speed for driving said second movable member at a mean speed substantially equal to that of said first movable member, a second slippable coupling in the driving connection between said means for driving said second movable member and said second movable member, speed detecting means for detecting relative changes in the speed of both of said movable members, and means controlled by said speed detecting means for automatically varying the relative slip in said couplings to oppose said changes in the speeds of said movable members.

2. Control mechanism comprising, in combination, a first movable member, means individual to said first movable member operable at a substantially constant speed for driving said first movable member, a slippable coupling in the driving connection between said driving means and said first movable member, a second movable member, means individual to said second movable member operable at a substantially constant speed for driving said second movable member at a mean speed substantially equal to that of said first movable member, a second slippable coupling in the driving connection between said means for driving said second movable member and said second movable member, differential gearing comprising input elements and an output element, said input elements being coupled to both of said movable members for rotation in opposite senses, and means for controlling the relative slip in said couplings in accordance with the direction of movement of said output element of said differential gearing.

3. Control mechanism comprising, in combination, a first movable member, means individual to said first movable member operable at a substantially constant speed for driving said first movable member, a slippable coupling in the driving connection betwen said driving means and said first movable member, a second movable member, means individual to said second movable member operable at a substantially constant speed for driving said second movable member at a mean speed substantially equal to that of said first movable member, a second slippable coupling in the driving connection between said means for driving said second movable member and said second movable member, brakes associated with each of said movable members, speed detecting means for detecting relative changes in the speed of both of said movable members, and means controlled by said speed detecting means to apply the brake associated with the faster moving member until a substantially equal speed of both movable members is reestablished.

4. Control mechanism comprising, in combination, a first movable member, means individual to said first movable member operable at a substantially constant speed for driving said first movable member, a hydraulic turbo coupling in the driving connection between said driving means and said first movable member, a second movable member, means individual to said second movable member operable at a substantially constant speed for driving said second movable member at a mean speed substantially equal to that of said first movable member, a second hydraulic turbo coupling in the driving connection between said means for driving said second movable member and said second movable member, brakes associated with each of said movable members, speed detecting means for detecting relative changes in the speed of both of said movable members, and means controlled by said speed detecting means to aply the brake associated with the faster moving member until a substantially equal speed of both movable members is reestablished.

5. Control mechanism comprising, in combination, a first movable member, means individual to said first movable member operable at a substantially constant speed for driving said first movable member, a slippable coupling in the driving connection between said driving means and said first movable member, a second movable member, means individual to said second movable member operable at a substantially constant speed for driving said second movable member at a mean speed substantially equal to that of said first movable member, a second slippable coupling in the driving connection between said means for driving said second movable member and said second movable member, differential gearing comprising two input elements and an output element, said input elements being coupled to the respective movable members for rotation in opposite senses, a brake associated with each movable member, and means controlled by movement of said output member from a position corresponding to equal speeds of said movable members for applying the brake to the faster moving member until the said output member is substantially restored to the said position.

6. Control mechanism comprising, in combination, a first movable member, means individual to said first movable member operable at a substantially constant speed for driving said first movable member, a hydraulic turbo coupling in the driving connection between said driving means and said first movable member, a second movable member, means individual to said second movable member operable at a substantially constant speed for driving said second movable member at a mean speed substantially equal to that of said first movable member, a second hydraulic turbo coupling in the driving connection between said means for driving said second movable member and said second movable member, differential gearing comprising two input elements and an output element, said input elements being coupled to the respective movable members for rotation in opposite senses, a brake associated with each movable member, and means controlled by movement of said output member from a position corresponding to equal speeds of said movable members for applying the brake of the faster moving member until the said output member is substantially restored to the said position.

7. Control mechanism comprising, in combination, a first movable member, means individual to said first movable member operable at a substantially constant speed for driving said first movable member, a hydraulic turbo coupling in the driving connection between said driving means and said first movable member, a second movable member, means individual to said second movable member operable at a substantially constant speed for driving said second movable member at a mean speed substantially equal to that of said first movable member, a second hydraulic turbo coupling in the driving connection between said means for driving said second movable member and said second movable member, speed detecting means for detecting relative changes in the speed of both of said moving members and means controlled by said speed detecting means for automatically varying the relative slip in said hydraulic turbo couplings to oppose said changes in the speeds of said movable members.

References Cited in the file of this patent

UNITED STATES PATENTS

| | | |
|---|---|---|
| 1,328,934 | Valls | Jan. 27, 1920 |
| 1,900,470 | Smith | Mar. 7, 1933 |
| 1,964,188 | Von Karabetz | June 26, 1934 |
| 2,104,582 | Carlson | Jan. 4, 1938 |
| 2,123,038 | Dallmann | July 5, 1938 |
| 2,255,773 | Heftler | Sept. 16, 1941 |
| 2,666,876 | Sinclair | Jan. 19, 1954 |